(12) United States Patent
Shibuya et al.

(10) Patent No.: US 7,087,904 B2
(45) Date of Patent: *Aug. 8, 2006

(54) POSITRON EMISSION TOMOGRAPHY DEVICE

(75) Inventors: Kengo Shibuya, Tokyo (JP); Masanori Koshimizu, Tokyo (JP); Keisuke Asai, Tokyo (JP)

(73) Assignee: Japan Science and Technology Agency, Saitama (JP)

( * ) Notice: Subject to any disclaimer, the term of this patent is extended or adjusted under 35 U.S.C. 154(b) by 342 days.

This patent is subject to a terminal disclaimer.

(21) Appl. No.: 10/451,755

(22) PCT Filed: Jul. 29, 2002

(86) PCT No.: PCT/JP02/07693

§ 371 (c)(1),
(2), (4) Date: Jun. 23, 2003

(87) PCT Pub. No.: WO03/042715

PCT Pub. Date: May 22, 2003

(65) Prior Publication Data

US 2004/0173752 A1 Sep. 9, 2004

(30) Foreign Application Priority Data

Nov. 16, 2001 (JP) .............................. 2001-351085

(51) Int. Cl.
*G01T 1/161* (2006.01)
*C09K 11/06* (2006.01)

(52) U.S. Cl. ........................... 250/363.03; 252/301.16; 252/301.18

(58) Field of Classification Search ........... 250/363.03; 252/301.18, 301.17
See application file for complete search history.

(56) References Cited

U.S. PATENT DOCUMENTS

| 5,864,141 | A | 1/1999 | Majewski et al. ..... 250/363.02 |
| 5,866,907 | A * | 2/1999 | Drukier et al. ............. 250/366 |
| 5,882,548 | A | 3/1999 | Liang et al. ........... 252/301.16 |
| 2001/0016029 | A1* | 8/2001 | Tumer ........................ 378/98.8 |
| 2003/0106483 | A1 | 6/2003 | Sugawara ..................... 117/19 |
| 2004/0084654 | A1* | 5/2004 | Shibuya et al. ........ 252/301.18 |

FOREIGN PATENT DOCUMENTS

| EP | 1 258 736 A | 11/2002 |
| WO | 03/012476 | 2/2002 |

OTHER PUBLICATIONS

Mitzi, Templating and Structural Engineering in Organic-Inorganic Perovskites, Journal of Chemical Society, Dalton Trans., 2001, p. 1-12.

(Continued)

*Primary Examiner*—David Porta
*Assistant Examiner*—Djura Malevic
(74) *Attorney, Agent, or Firm*—Gary C Cohn PLLC

(57) ABSTRACT

This invention is a positron emission tomography (PET) device comprising as a scintillator a perovskite organic/inorganic hybrid compound selected from the group represented by the general formulae:

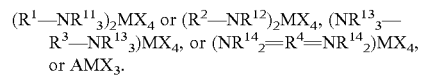

or $AMX_3$.

When used as a scintillator, the perovskite organic/inorganic hybrid compound emits visible light with a very fast (sub-nanosecond order) response, allowing for improved resolution and time-of-flight PET methods.

17 Claims, 2 Drawing Sheets

OTHER PUBLICATIONS

Ishihara et al., Exciton State in Two-Dimensional Perovskite Semiconductor $(C_{10}H_{21}NH_3)_2PbI_4$, Solid State Communications, vol. 69, No. 9, 1989, p. 933-936.

Sugahara et al., Experimental Evidence of Pairing Fractional Quantum Hall Effect State in High Temperature Oxide Superconductors . . . , Physica C 317-318, 1999, 618-620.

Sugahara et al., Anomalous AC Dielectric Response and Carrier State of C-Axis Oriented $La_2$—$xSr_xCuO_4$ Films, Physica C 293, 1997, 216-219.

U.S. Appl. No. 10/182,924, filed Dec. 7, 2001, Shibuya.

U.S. Appl. No. 10/451,761, filed Jul. 16, 2002, Shibuya.

* cited by examiner

POSITRON EMISSION TOMOGRAPHY DEVICE

TECHNICAL FIELD OF THE INVENTION

This invention relates to a positron emission tomography device, and more specifically, to a positron emission tomography device using a γ-ray detector comprising a very fast (of the order of nanoseconds or less) scintillator.

PRIOR ART

Positron emission tomography (henceforth "PET"), is a tomographic method used for nuclear medical diagnosis wherein a subject is given a radioactive drug (tracer) labeled by a positron radiator, the radiation emitted outside the body is measured, and the concentration distribution of the drug is measured as a tomogram. ("Medical Imaging Handbook" (1994); RADIOISOTOPES, 42, 189–198; (1993) RADIO-ISOTOPES, 42, 237–254); (1993) RADIOISOTOPES, 42, 301–314; (1993) RADIOISOTOPES, 42, 365–376 (1993).

The positrons emitted from the tracer (atomic nucleus) travel several millimeters inside the body, lose kinetic energy, collide with nearby electrons and disappear. At this time, γ-rays (511 keV) having an energy equivalent to the electronic mass are emitted in the 180° direction. By detecting these γ-rays with a detector, processing the signal and performing image reconstruction, a tomogram of the distribution of the positron emission tracer in the body is obtained.

This detector usually comprises a scintillator, a photomultiplier and the necessary electronic circuitry. It is preferred that this scintillator uses a crystal scintillation having a fast response, using crystals such as NaI(Tl), BGO ($Bi_4Ge_3O_{12}$), CsF, $BaF_2$, LSO ($Lu_2(SiO_4)O:Ce$). Of these, the γ-ray detection efficiency of BGO is high and it is therefore often used, but it has the fault that the damping time is as slow as about 300 ns. The damping time of NaI (Tl) is also of the same order.

If the response time of the scintillator used as PET detector is slow, and the signal from the detector has a fairly large width over time, the disappearance position of the tracer cannot be determined within this width. With the newest PET devices, the spatial resolving power is increasing, but complex computational processing is required.

Time-of-flight type PET aims to improve the PET image by measuring the time lag during which γ-rays travel inside the body by an external detector (RADIOISOTOPES, 42, and 301–314 (1993)). Specifically, if two detectors detect the γ-rays emitted in the 180° direction, the difference of their arrival times is equivalent to the flight time of light moving through a distance which is twice the difference of tracer positions, so the tracer position can be measured. In this field, a resolution of 1 cm or less is ideally required, which corresponds to a scintillator having a response speed of about $10^{-10}$ seconds (0.1 ns). For this reason, $BaF_2$ crystals with a fast response are used, but their response speed (resolution) is only approx. 300–400 ps, and a faster scintillator was desired ("Medical Image Handbook", Shinohara (1994)).

On the other hand, the Inventor already discovered that the radiation resistance of the exciton luminescence of a specific perovskite organic/inorganic hybrid compound is high, and that if this compound is used as a radiation scintillator, it emits visible light with a very fast response (Japanese Unexamined Patent Application No. 2001-006132, Japanese Unexamined Patent Application No. 2001-231205). It was shown that such a perovskite type organic/inorganic hybrid compound can be used for detection and dosimetry of ultrashort pulse ionizing radiation.

Problems to be Solved by the Invention

As the response speed of the scintillator used in the prior art positron emission tomography device was extremely limited, there was also a limit to the resolution of the positron emission tomography device. To resolve this problem, it was understood that the scintillator should have a response speed of approx. $10^{-10}$ seconds (0.1 ns). If such a scintillator can be manufactured, a time-of-flight PET can be realized.

Means to Solve the Problems

The Inventors already discovered that when a specific perovskite organic/inorganic hybrid compound is used as a radiation scintillator, it emits light with a very fast response.

It was discovered that by using this scintillator as a γ-ray detector of a positron emission tomography device, the problems inherent in the positron emission tomography device of the related art could be solved.

Specifically, this invention is a positron emission tomography device comprising a γ-ray detector consisting of a scintillator and a light-receiving device, wherein said scintillator is a perovskite organic/inorganic hybrid compound selected from the group represented by the general formulae:

$(R^1-NR^{11}_3)_2MX_4$ or $(R^2-NR^{12}_2)_2MX_4$, $(NR^{13}_3-R^3-NR^{13}_3)MX_4$ or $(NR^{14}_2=R^4=NR^{14}_2)MX_4$, or $AMX_3$. In addition to a γ-ray detector, the positron emission tomography device of this invention may also comprise electronic circuitry for processing the signal from the γ-ray detector, and a computer which performs image reconstruction and other tasks.

$R^1$ is a monovalent hydrocarbon group, which may be a straight chain, branched or cyclic, preferably having 2–18 carbon atoms preferably an alkyl group, aryl group or aralkyl group, more preferably an alkyl group. The aryl group is preferably phenyl. The aralkyl group is preferably $(C_6H_5)C_nH_{2n}$ (n=2~4). $R^1$ may also include a heterocyclic ring such as pyrrole or thiophene. $R^{11}$ is hydrogen or an alkyl group having two or fewer carbon atoms, preferably hydrogen or methyl, more preferably hydrogen, and may be the same as or different from each other such group in the organic/inorganic hybrid compound.

$R^2$ is a divalent hydrocarbon group which may contain a heterocyclic ring, may be substituted by a halogen atom and may be cyclic. $R^{12}$ is hydrogen or an alkyl group having two or fewer carbon atoms, preferably hydrogen or methyl, more preferably hydrogen, and may be the same as or different from each other such group in the organic/inorganic hybrid compound.

$R^3$ is a divalent hydrocarbon group which may contain a heterocyclic ring and may be substituted by a halogen atom. Examples of divalent hydrocarbon groups are straight chain or branched, but preferably straight chain, alkyl groups preferably having 2–18 carbon atoms. These may further contain a phenylene group ($-C_6H_4-$), preferably p-phenylene, a propyl group, or a heterocyclic ring such as thiophene. $R^3$ may comprise only heterocyclic rings. An example of the perovskite organic/inorganic hybrid compound when it contains a thiophene group, is the compound having the following structural formula:

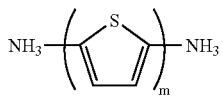

(wherein, m represents an integer in the range of 2–8).

$R^{13}$ is hydrogen or an alkyl group having two or fewer carbon atoms, preferably hydrogen or methyl, more preferably hydrogen, and may be the same as or different from each other such group in the organic/inorganic hybrid compound.

$R^4$ is a tetravalent hydrocarbon group which may contain a heterocyclic ring, may be substituted by a halogen atom and may be cyclic. An example of the perovskite organic/inorganic hybrid compound when $R^4$ is cyclic, is the compound having the following structural formula:

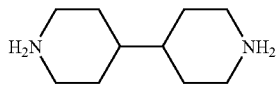

$R^{14}$ is hydrogen or an alkyl group having two or fewer carbon atoms, preferably hydrogen or methyl, more preferably hydrogen, and may be the same as or different from each other such group in the organic/inorganic hybrid compound.

If $R^1$–$R^4$ contain unsaturated bonds such as double bonds or triple bonds, high energy radiation is absorbed causing radical reactions, which is undesirable. However, the perovskite organic/inorganic hybrid compound may be formed by using a precursor containing double bonds or triple bonds, and then eliminating these unsaturated bonds by crosslinking them, by irradiating with high energy radiation. In this case, by crosslinking the organic layer comprising these hydrocarbon groups, crystal imperfections due to heating, etc., decrease, and the performance can be stabilized when the compound is used as a scintillator.

A represents $R^5$—$NH_3$, $R^6$=$NH_2$ or a mixture thereof, $R^5$ represents a methyl group or hydrogen which may be substituted by an amino group or halogen atom, and $R^6$ represents a methylene group which may be substituted by an amino group or halogen atom.

An example of the perovskite organic/inorganic hybrid compound where this A part is a mixture, is $(CH_3NH_3)_{(1-x)}(NH_2CH$=$NH_2)_xPbBr_3$ (0<x<1).

As A, a moiety of small volume, such as $[CH_3NH_3]^+$ or $[NH_4]^+$, is used.

As the volume of these moities ($R_5$—$NH_3$) or ($R_6$=$NH_2$) is small, the inorganic layers are not separated by an organic material, so a three-dimensional network of an inorganic substance is formed, and the organic substance enters the interstices between regular octahedronal clusters of the metal halide. Herein, the conditions for ($R_5$—$NH_3$) or ($R_6$=$NH_2$) are that they are monovalent cations of a size which can be occluded in the interstices of the three-dimensional compound.

Specifically, $R^5$ is a methyl group or hydrogen, and this methyl group may be substituted by an amino group or halogen atom. $R^6$ represents a methylene group, and this methylene group may be substituted by an amino group or halogen atom.

Examples of ($R_5$—$NH_3$) or ($R_6$=$NH_2$) are H—$NH_3$, $CH_3$—$NH_3$ and $NH_2CH$=$NH_2$ (formamidinium cation). It is preferred that this scintillator is a single crystal, but it is not necessarily a single crystal and may be a polycrystal coated on a substrate.

X is a halogen atom, preferably Cl, Br or I. X may also be a mixture of these halogens.

M is a Group IVa metal, Eu, Cd, Cu, Fe, MN or Pd, preferably a Group IVa metal or Eu, more preferably a Group IVa metal, still more preferably Ge, Sn or Pb, and most preferably, Pb.

In the figure, 1 is a detector, 2 is a data acquisition unit, 3 is an image information control unit, 4 is a calculation processing unit, 5 is a dosage control unit, 6 is a dosage unit and 7 is a display unit.

Figure 2:
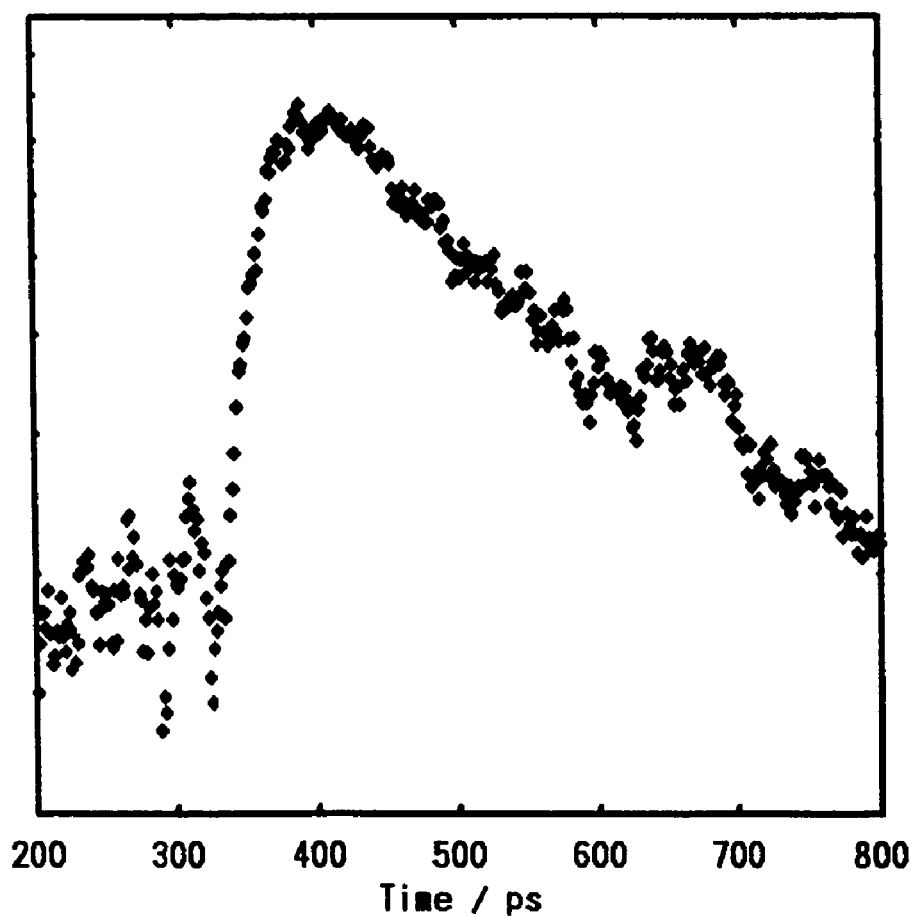

FIG. 2 shows the time profile of the scintillation of $(CH_3NH_3)PbBr_3$.

Figure 3:
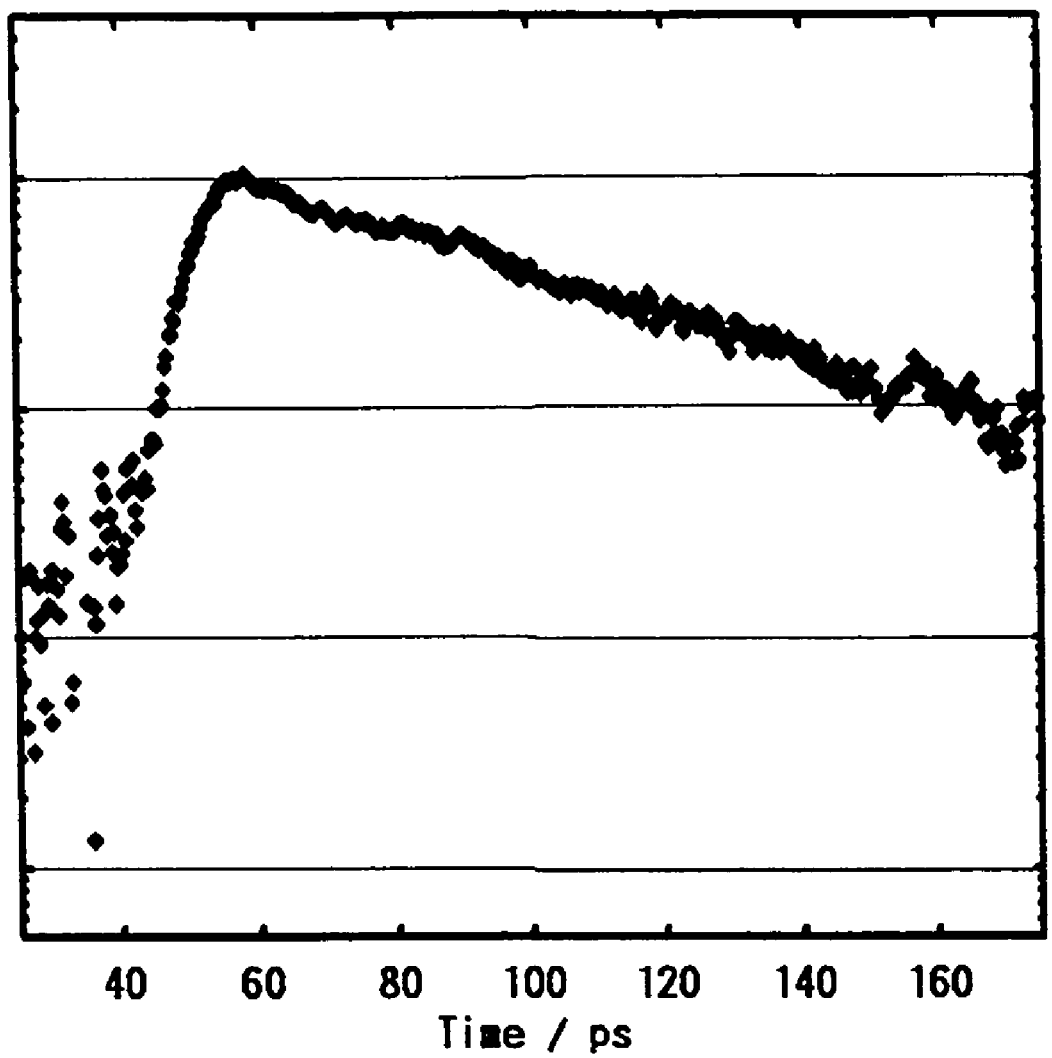

FIG. 3 shows the time profile of the scintillation of $(C_6H_{13}NH_3)_2PbI_4$.

DETAILED DESCRIPTION OF THE INVENTION

Hereafter, this invention will be further described by examples, but these are not to be construed as limiting the invention in any way.

Figure 1:
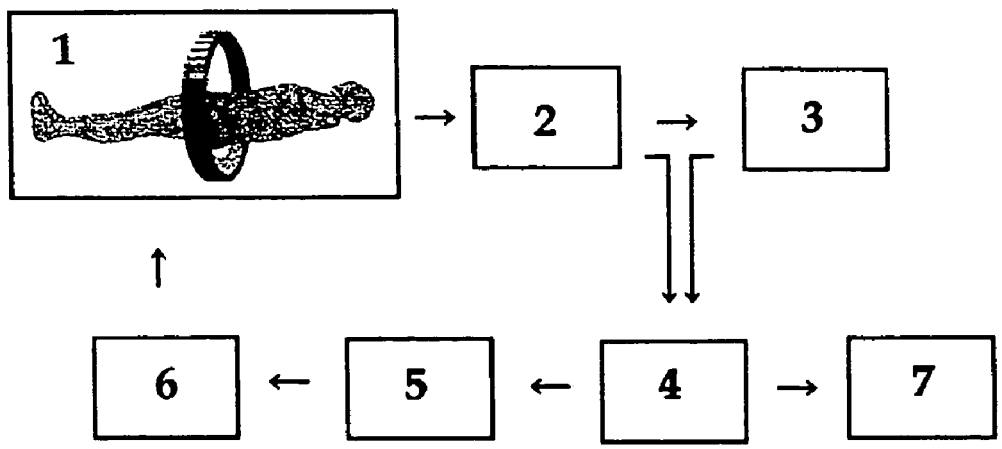
FIG. 1 shows the typical construction of a positron emission tomography device.

A positron emission tomography device comprises a γ-ray detector, an electronic circuit which processes this signal, and a computer which performs image reconstruction and other tasks. An example of this device is shown in FIG. 1.

This device comprises a detector 1, a data acquisition unit 2, an image information control unit 3, a calculation processing unit 4, a dosage control unit 5, a dosage unit 6 and a display unit 7. The detector 1 is arranged in a circle so that a large number of γ-ray detectors surround the measured part of a subject (or analyte). Each detector is connected by coincidence circuits to plural detectors in the opposite position on the circumference.

These γ-ray detectors are assigned an address so that they can identify a spatial position, and their light-receiving surface is oriented in the direction of the measured part.

A γ-ray is emitted in the 180° direction from the measured part by a positron emitted from the tracer, and detected by the γ-ray detector facing this γ-ray.

Each γ-ray detector is connected to the data acquisition part 2, and the detected signal is transmitted from the γ-ray detector to the data acquisition part 2. The data acquisition part 2 records the pair of detectors in the large number of γ-ray detectors forming the detector 1 which detected the γ-ray, on each occasion that there is a coincidence count. This data is stored in the data acquisition part 2, and is sent to the image information control part 3 according to a preset image pick-up frame. The image information control part 3 has prestored image information, and sends the image information to the calculation processing part 4 according to the image pick-up frame. The dosage unit 6 has a means (for example, an intravenous injection syringe) for administering the tracer to the subject (or analyte), and the tracer is thereby suitably administered to the subject (or analyte) under the control of the dosage control unit 5. Based on the data sent from the data acquisition part 2 and the image information control part 3, the calculation processing part 4 calculates the tracer dosage conditions required by the measured part of the subject (or analyte), transmits them to the dosage control unit 5, and thereby controls the dosage conditions of the dosage unit 6.

The display unit 7 displays the γ-ray concentration or a computed tomogram sent from the calculation processing part 4.

The γ-ray detector comprises a scintillator for γ-rays, light-receiving device, and other required electrical circuits.

The scintillator is the above-mentioned perovskite organic/inorganic hybrid compound.

A comparison of the performance of these compounds with existing scintillators is shown in Table 1. From this table, it is seen that the perovskite organic/inorganic hybrid compound of this invention has a short decay time constant compared with other existing scintillators, and that the estimated response speed including the rising of the signal is very near about 0.1 ns, which is currently required for PET.

TABLE 1

| Scintillator | NaI (Tl) | BGO | BaF$_2$ | LSO | Compound A | Compound B |
|---|---|---|---|---|---|---|
| Atomic No. | 53, 11 | 83, 32, 8 | 56, 9 | 71, 58, 14, 8 | 82, 35, 7, 6, 1 | 82, 53, 7, 6, 1 |
| Peak wave length (nm) | 410 | 480 | 220 300 | 420 440 | 550 | 525 |
| Decay time constant (ns) | 250 | 300 | 06 620 | 32 54 | 0.16 | 0.045 |
| Relative luminescence | 100 | 15 | 6 32 | 38 | not measured | not measured |

There is no particular limitation on the light-receiving device, but as the scintillator of this invention emits light in the visible light range (about 400–600 nm), it is preferred to use a photomultiplier for visible light as the light-receiving device. The precise luminescence wavelength varies with the structure of the perovskite organic/inorganic hybrid compound, so it is preferred to use a photomultiplier suitably adjusted for this.

The construction of the γ-ray detector can be suitably modified for PET.

Examples are a construction wherein the scintillator is in contact with the light-receiving surface of the photomultiplier, a construction wherein the scintillator and photomultiplier are connected by a light waveguide, a construction wherein the light emitted by the scintillator is received by a photomultiplier separated from the scintillator, or a construction wherein the light emitted by the scintillator is received by a light-receiving port separated from the scintillator, and this light-receiving port and photomultiplier are connected by a light waveguide. The signal of the light-receiving device is processed by the usual method.

The resolution of the PET device depends on the width of the scintillator, which is preferably as small as possible. If the photomultiplier is made small on the other hand, there is a problem that performance falls. Therefore, the construction of the γ-ray detector is usually that of the individual connection type wherein the scintillator and photomultiplier correspond to each other 1:1, or the coding type wherein a large number of scintillators are connected with a small number of photomultipliers (RADIOISOTOPES, 42, 237–254 (1993)). These constructions may be used for the PET of this invention, or other constructions may be used.

A ring having a partition may be interposed between a scintillator and a photomultiplier to reduce noise. Such a γ-ray detector may be combined as appropriate with known techniques in this field (RADIOISOTOPES, 42, and 237–254(1993)).

As the scintillator of this invention has a response speed of subnanosecond order or less, it may be used as a γ-ray detector of a time-of-flight PET. The construction of this PET device is identical to that of an ordinary PET device, and the electronic circuit which processes the signal of the γ-ray detector is constructed so that, by measuring the time lag of the signal from two γ-ray detectors, the spatial position of the tracer can be reconstructed.

The compound A of Table 1 is $(CH_3NH_3)PbBr_3$, and its decay time constant is shown in Measurement Example 1. The compound B of Table 1 is $(C_6H_{13}NH_3)_2PbI_4$, and its decay time constant is shown in Measurement Example 2. NaI(Tl), BGO, BaF$_2$, LSO are reference values. For $(C_6H_{13}NH_3)_2PbI_4$ in Measurement Example 2, measurements were carried out on a film, but if the same procedure as that of Measurement Example 1 is performed on this compound, crystals can be produced.

The amount of luminescence can be increased by cooling the scintillator of this invention by a suitable means.

As shown in the measurement examples, the decay time constant of the perovskite organic/inorganic hybrid compound of this invention shown in Table 1 was measured using an electron beam, but the physical and chemical processes induced in the irradiated substance are essentially identical for electron beam irradiation and γ-rays. It is therefore considered that the values for Compound A and Compound B in the table are identical to those obtained by irradiating with γ-rays.

As the PET device of this invention comprises a γ-ray detector comprising a scintillator having a very fast response (subnanosecond order or less) with respect to γ-rays, its image resolution is very high, and it can be used as a time-of-flight PET.

EXAMPLES 1

60.22 g hydrobromic acid (HBr, Wako Pure Chemicals, concentration 0.48) was introduced in a 200 ml flask at room temperature, and 27.06 g of 40% aqueous methylamine solution (Wako Pure Chemicals, concentration 0.41) was gradually dripped in. As this is an exothermic reaction, the flask is placed in a water bath. Methylamine was dripped until the molar ratio of hydrobromic acid, HBr, to methylamine, $CH_3NH_2$, was 1:1. After addition was complete, the mixture was left with stirring for 1 hour to complete the reaction, and a colorless, transparent aqueous solution of methylamine bromide was thus obtained.

When the water was removed on an evaporator (water bath temperature 45° C.), a white powder of methylamine bromide remained. This was washed by diethyl ether (suction filtration), and after removing unreacted material, it was dried. The yield was 35.98 g, i.e., 90.0%.

Next, 18.8 g of the methylamine bromide obtained as mentioned above was dissolved in 100 ml DMF in a 200 ml three-necked flask at room temperature, and 61.62 g lead bromide, $PbBr_2$ (Highly Pure Chemicals, purity 99.99%) was added a little at a time until the molar ratio of methylamine bromide and lead bromide, $PbBr_2$, was 1:1. To avoid reaction between the moisture in the air in the three-necked flask, the mixture was left with stirring for 1 hour to complete the reaction while steadily passing a current of dry nitrogen through the flask, and a DMF solution (transparent and colorless) of the perovskite type compound, $(CH_3NH_3)PbBr_3$, was thereby obtained. The solvent was evaporated on an evaporator (water bath temperature approx. 80° C.), and a microcrystalline powder of a red perovskite compound remained. This was washed by diethyl ether to remove unreacted material, and dried. The yield was 78.41 g, i.e., 97.5%.

The microcrystalline powder of the obtained perovskite compound was dissolved in as little of a good solvent (dehydrated DMF) as possible, and undissolved material was filtered off using a filter having a retention capacity of about 0.1 micrometers. This solution was introduced into a container (glass bottle A) for depositing crystals. Glass bottle A was subjected to ultrasonic cleaning with pure water beforehand. Next, a poor solvent (toluene, diethyl ether, nitromethane, etc.) was introduced into a glass bottle B. In order to dehydrate the poor solvent, a little calcium chloride powder was also introduced into glass bottle B. Glass bottle A and glass bottle B were stored in a desiccator, sealed off from the atmosphere, and left for four days at room temperature. At this time, the poor solvent which evaporated from glass bottle B spread into the perovskite compound solution in glass bottle A so that the solubility of the solution in glass bottle A gradually fell, and red, transparent single crystals of perovskite type compound deposited on the bottom of glass bottle A. Glass bottle A was shaded by wrapping the whole desiccator in aluminum foil. By this method, single crystals of approx. 2 cm×2 cm×1 cm can easily be produced.

When the obtained single crystals were excited using an electron beam pulse of 200 femtoseconds accelerated to 30 MeV by a linear accelerator (LINAC) in vacuo (approx. $10^{-6}$ torr ($1.33\times10^{-4}$ Pa)), a luminescence with a peak wavelength of 550 nm was observed. The time transition of luminescence intensity of this luminescence was measured using a streak camera (Hamamatsu Photonics, Inc., FESCA-200) with a resolving time of 260 femtoseconds as light receiving device. The result is shown in FIG. 2. As a result of this numerical analysis, the decay time constant of this luminescence was approx. 160 picoseconds.

EXAMPLE 2

A stratified perovskite compound $(C_6H_{13}NH_3)_2PbI_4$ was synthesized by reacting lead iodide, $PbI_2$, as metal halide, with $C_6H_{13}NH_3I$ as organoamine halide acid salt in a molar ratio of 1:2, in N,N-dimethylformamide (reaction temperature: room temperature (20° C.), reaction time: 1 hour or more).

1 g of this stratified perovskite compound was dissolved in 3 ml of acetone, and spin-coated onto a silicone (Si) substrate of 2 cm side using a Shimadzu P/N 202-32016 (rotation speed: 5000 rpm, time: 30 seconds or more), so as to manufacture a scintillator (thickness of stratified perovskite compound, 0.1 micrometers). Herein, a silicon substrate is used to avoid luminescence from the substrate.

The radiation detector used in this measurement example comprises a cylindrical stainless steel pillar having a diameter of approx. 50 cm, and provided with a window on which the radiation is incident, light-receiving port, sample holder and pressure reducing device. This sample holder is a movable type wherein a sample (i.e., the scintillator) can be arranged effectively in the center of the pillar. The light-receiving port is connected with an external detector by a light waveguide, and measures and records the amount of light received. Examples of detectors used were a spectroscope (Acton Research Corporation, SpectraPro 150), grating (Acton Research Corporation, 150 gr/mm, Blaze 500 nm), and a CCD camera (Prinston Instruments, 330×1100 (8ch).

The scintillator (1 cm×1 cm×0.1 micrometers) manufactured as mentioned above was set in this sample holder so that the radiation incident on the surface of the stratified perovskite compound impinged perpendicularly. Subsequently, the pressure was decompressed to $1.0\times10^{-6}$ Torr using a combination of a rotary pump and turbo-molecular pump as decompression device. This scintillator was irradiated by hydrogen ions (protons) accelerated to 2 MeV at a flux of $3\times10^{11}$ ions sec$^{-1}$ cm$^{-2}$ (50A) at room temperature (Nissin High Voltage Van der Graaf accelerator), and the irradiation time was varied to 5 seconds, 20 seconds and 180 seconds. From this scintillator, a strong exciton luminescence having a wavelength of 524 nm (visible region) was observed.

The time transition of luminescence intensity of this luminescence, observed by exciting the scintillator manufactured as described above using an electron beam pulse of 200 femtoseconds accelerated to 30 MeV(s) by a linear accelerator (LINAC) in vacuo (approx. $10^{-6}$ torr), was measured by a streak camera with a resolving time of 260 femtoseconds as light-receiving device. The result is shown in FIG. 3.

As a result of this numerical analysis, the decay time constant of this luminescence was approx. 45 picoseconds.

What is claimed is:

1. A positron emission tomography device comprising a γ-ray detector consisting of a scintillator and a light-receiving device, wherein said scintillator is a perovskite organic/inorganic hybrid compound selected from the group represented by the general formulae: $(R^1—NR^{11}_3)_2MX_4$ or $(R^2—NR^{12})_2MX_4$, $(NR^{13}_3—R^3—NR^{13}_3)MX_4$ or $(NR^{14}_2=R^4=NR^{14}_2)MX_4$, or $AMX_3$ wherein, $R^1$ is a monovalent hydrocarbon group which may include a heterocyclic ring, and may be substituted by a halogen atom, $R^2$ is a divalent hydrocarbon group which may contain a heterocyclic ring, may be substituted by a halogen atom and may be cyclic, $R^3$ is a divalent hydrocarbon group which may contain a heterocylic ring and may be substituted by a halogen atom, $R^4$ is a tetravalent hydrocarbon group which may contain a heterocyclic ring, may be substituted by a halogen atom and may be cyclic, A represents $R^5—NH_3$, $R^6=NH_2$ or a mixture thereof, $R^5$ is a hydrogen atom or a methyl group which may be substituted by an amino group or halogen atom, $R^6$ is a methylene group which may be substituted by an amino group or halogen atom, each $R^{11}$, $R^{12}$, $R^{13}$ and $R^{14}$ group is hydrogen or an alkyl group having two or fewer carbon atoms, and may be the same as or different from each other such group in the organic/inorganic hybrid compound, M is a Group IVa metal, Eu, Cd, Cu, Fe, Mn or Pd, and each X is a halogen that may be the same or different than the other X groups in the organic/inorganic hybrid compound.

2. The positron emission tomography device of claim 1, further comprising an electronic circuit which processes the signal of said γ-ray detector, and a computer which performs image reconstruction and other tasks.

3. The positron emission tomography device of claim 1, wherein said perovskite organic/inorganic hybrid compound is in the form of a single crystal.

4. The positron emission tomography device of claim 1, wherein the hydrocarbon groups of the perovskite organic/inorganic hybrid compound is selected from the group represented by the formulae $(R^1-NR^{11}_3)_2MX_4$ or $(R^2-NR^{12})_2MX_4$, or, $(NR^{13}_3-R^3-NR^{13}_3)MX_4$ or $(NR^{14}_{2=R}^4=NR^{14}_2)MX_4$ wherein $R^1$ is a monovalent hydrocarbon group which may include a heterocyclic ring, and may be substituted by a halogen atom, $R^2$ is a divalent hydrocarbon group which may contain a heterocyclic ring, may be substituted by a halogen atom and may be cyclic, $R^3$ is a divalent hydrocarbon group which may contain a heterocyclic ring and may be substituted by a halogen atom, $R^4$ is a tetravalent hydrocarbon group which may contain a heterocyclic ring, may be substituted by a halogen atom and may be cyclic, each $R^{11}$, $R^{12}$, $R^{13}$ and $R^{14}$ group is hydrogen or an alkyl group having two or fewer carbon atoms, and may be the same as or different from each other such group in the organic/inorganic hybrid compound, and M is a Group IVa metal, Eu, Cd, Cu, Fe, Mn or Pd, and the hybrid compound is crosslinked.

5. The positron emission tomography device of claim 2, wherein said device is of the time-of-flight type.

6. The positron emission tomography device of claim 2, wherein said perovskite organic/inorganic hybrid compound is in the form of a single crystal.

7. The positron emission tomography device of claim 2, wherein the hydrocarbon groups of the perovskite organic/inorganic hybrid compound is selected from the group represented by the formulae $(R^1-NR^{11}_3)_2MX_4$ or $(R^2-NR^{12})_2MX_4$, or, $(NR^{13}_3-R^3-NR^{13}_3)MX_4$ or $(NR^{14}_2=R^4=NR^{14}_2)MX_4$ wherein $R^1$ is a monovalent hydrocarbon group which may include a heterocyclic ring, and may be substituted by a halogen atom, $R^2$ is a divalent hydrocarbon group which may contain a heterocyclic ring, may be substituted by a halogen atom and may be cyclic, $R^3$ is a divalent hydrocarbon group which may contain a heterocyclic ring and may be substituted by a halogen atom, $R^4$ is a tetravalent hydrocarbon group which may contain a heterocyclic ring, may be substituted by a halogen atom and may be cyclic, each $R^{11}$, $R^{12}$, $R^{13}$ and $R^{14}$ group is hydrogen or an alkyl group having two or fewer carbon atoms, and may be the same as or different from each other such group in the organic/inorganic hybrid compound, and M is a Group IVa metal, Eu, Cd, Cu, Fe, Mn or Pd and the hybrid compound is crosslinked.

8. A time-of-flight positron emission tomography device comprising a γ-ray detector consisting of a scintillator and a light-receiving device, wherein said scintillator is a perovskite organic/inorganic hybrid compound selected from the group represented by the general formulae: $(R^1-NR^{11}_3)_2MX_4$ or $(R^2-NR^{12})_2MX_4$, $(NR^{13}_3-R^3-NR^{13}_3)MX_4$ or $(NR^{14}_2=R^4=NR^{14}_2)MX_4$, or $AMX_3$ wherein, $R^1$ is a monovalent hydrocarbon group which may include a heterocyclic ring, and may be substituted by a halogen atom, $R^2$ is a divalent hydrocarbon group which may contain a heterocyclic ring, may be substituted by a halogen atom and may be cyclic, $R^3$ is a divalent hydrocarbon group which may contain a heterocyclic ring and may be substituted by a halogen atom, $R^4$ is a tetravalent hydrocarbon group which may contain a heterocyclic ring, may be substituted by a halogen atom and may be cyclic, A represents $R^5-NH_3$, $R^6=NH_2$ or a mixture thereof, $R^5$ is a hydrogen atom or a methyl group, which may be substituted by an amino group or halogen atom, $R^6$ is a methylene group, which may be substituted by an amino group or halogen atom, each $R^{11}$, $R^{12}$, $R^{13}$ and $R^{14}$ group is hydrogen or an alkyl group, having two or fewer carbon atoms, and may be the same as or different from each other such group in the organic/inorganic hybrid compound, M is a Group IVa metal, Eu, Cd, Cu, Fe, Mn or Pd, and each X is a halogen that may be the same or different than the other X groups in the organic/inorganic hybrid compound.

9. The positron emission tomography device of claim 8, wherein said perovskite organic/inorganic hybrid compound is in the form of a single crystal.

10. The positron emission tomography device of claim 8, wherein the hydrocarbon groups of the perovskite organic/inorganic hybrid compound is selected from the group represented by the formulae $(R^1-NR^{11}_3)_2MX_4$ or $(R^2-NR^{12})_2MX_4$, or, $(NR^{13}_3-R^3-NR^{13}_3)MX_4$ or $(NR^{14}_{2=R}^4=NR^{14}_2)MX_4$ wherein $R^1$ is a monovalent hydrocarbon group which may include a heterocyclic ring, and may be substituted by a halogen atom, $R^2$ is a divalent hydrocarbon group which may contain a heterocyclic ring, may be substituted by a halogen atom and may be cyclic, $R^3$ is a divalent hydrocarbon group which may contain a heterocyclic ring and may be substituted by a halogen atom, $R^4$ is a tetravalent hydrocarbon group which may contain a heterocyclic ring, may be substituted by a halogen atom and may be cyclic, each $R^{11}$, $R^{12}$, $R^{13}$ and $R^{14}$ group is hydrogen or an alkyl group having two or fewer carbon atoms, and may be the same as or different from each other such group in the organic/inorganic hybrid compound, and M is a Group IVa metal, Eu, Cd, Cu, Fe, Mn or Pd and the hybrid compound is crosslinked.

11. The positron emission tomography device of claim 9, further comprising an electronic circuit which processes the signal of said γ-ray detector, and a computer which performs image reconstruction and other tasks.

12. The positron emission tomography device of claim 11, wherein said device is of the time-of-flight type.

13. The positron emission tomography device of claim 12 scintillator has a response speed of about 0.1 nanosecond or less.

14. A positron emission tomography device comprising a γ-ray detector consisting of a scintillator and a light-receiving device, wherein said scintillator is a perovskite organic/inorganic hybrid compound in the form of a single crystal, said hybrid compound being selected from the group represented by the general formulae: $(R^1-NR^{11}_3)_2MX_4$ or $(R^2-NR^{12})_2MX_4$, $(NR^{13}_3-R^3-NR^{13}_3)MX_4$ or $(NR^{14}_2=R^4=NR^{14}_2)MX_4$, or $AMX_3$ wherein, $R^1$ is a monovalent hydrocarbon group which may include a heterocyclic ring, and may be substituted by a halogen atom, $R^2$ is a divalent hydrocarbon group which may contain a heterocyclic ring, may be substituted by a halogen atom and may be cyclic, $R^3$ is a divalent hydrocarbon group which may contain a heterocyclic ring and may be substituted by a halogen atom, $R^4$ is a tetravalent hydrocarbon group which may contain a heterocyclic ring, may be substituted by a halogen atom and may be cyclic, A represents $R^5-NH_3$, $R^6=NH_2$ or a mixture thereof, $R^5$ is a hydrogen atom or a methyl group which may be substituted by an amino group or halogen atom, $R^6$ is a methylene group which may be substituted by an amino group or halogen atom, each $R^{11}$, $R^{12}$, $R^{13}$ and $R^{14}$ group is hydrogen or an alkyl group having two or fewer carbon atoms, and may be the same as or different from each other such group in the organic/inorganic hybrid compound, M is a Group IVa metal, Eu, Cd, Cu, Fe, Mn or Pd, and each X is a halogen that may be the same or different than the other X groups in the organic/inorganic hybrid compound wherein the hydrocarbon groups of the perovskite organic/inorganic hybrid compound are selected from the group represented by the formulae $(R^1-NR^{11}_3)_2MX_4$ or $(R^2-NR^{12})_2MX_4$, or, $(NR^{13}_3-R^3-NR^{13}_3)MX_4$ or $(NR^{14}_2=R^4=NR^{14}_2)MX_4$ wherein $R^1$ is a monovalent hydrocarbon group which may include a heterocyclic ring, and may be substituted by a halogen atom, $R^2$ is a divalent hydrocarbon group which may contain a heterocyclic ring, may be substituted by a halogen atom and may be cyclic, $R^3$ is a divalent hydrocarbon group which may contain a heterocyclic ring and may be substituted by a halogen atom, $R^4$ is a tetravalent hydrocarbon group which may contain a heterocyclic ring, may be substituted by a halogen atom and may be cyclic, each $R^{11}$, $R^{12}$, $R^{13}$ and $R^{14}$ group is hydrogen or an alkyl group having two or fewer carbon atoms, and may be the same as or different from each other such group in the organic/inorganic hybrid compound, and M is a Group IVa metal, Eu, Cd, Cu, Fe, Mn or Pd and the hybrid compound is crosslinked.

15. The positron emission tomography device of claim 14, further comprising an electronic circuit which processes the signal of said γ-ray detector, and a computer which performs image reconstruction and other tasks.

16. The positron emission tomography device of claim 15, wherein said device is of the time-of-flight type.

17. The positron emission tomography device of claim 16 scintillator has a response speed of about 0.1 nanosecond or less.

* * * * *